United States Patent [19]

Burysek et al.

[11] Patent Number: 4,908,006
[45] Date of Patent: Mar. 13, 1990

[54] BELT TIGHTENING DEVICE FOR OPEN-END SPINNING MACHINES

[75] Inventors: František Buryšek, Ûstí nad Orlicí; Miloslav Kubovy, Dolní Dobrouč; Agaton Plaňansky; Miloš Mládek, both of Ûstí nad Orlicí, all of Czechoslovakia

[73] Assignee: V zkumny Ûstav Bavlnársk, Ûstí nad Orlicí, Czechoslovakia

[21] Appl. No.: 256,835

[22] Filed: Oct. 12, 1988

[51] Int. Cl.[4] .............................................. F16H 7/12
[52] U.S. Cl. ..................................... 474/117; 474/135
[58] Field of Search .............. 474/117, 115, 113, 109, 474/111, 133, 135

[56] References Cited

U.S. PATENT DOCUMENTS 4,141,245  2/1979  Brandstetter ................... 474/135 X
4,416,647  11/1983  White, Jr. ....................... 474/135 X

FOREIGN PATENT DOCUMENTS 198068    6/1982  Czechoslovakia .
2048959  10/1970  Fed. Rep. of Germany .
1349263    4/1974  United Kingdom .
2009258    6/1979  United Kingdom .

Primary Examiner—Thuy M. Bui
Attorney, Agent, or Firm—Beveridge, DeGrandi & Weilacher

[57] ABSTRACT

A belt tightening device is provided for open-end spinning machines which is capable of ensuring good belt thrust, eliminating vibrations, and reducing the noise level of the machine. Each bearing box of a belt tightening roll is attached to the end of a pair of flat legs extending in spaced apart relationship to each other along the endless driving belt. The legs are connected to the bearing box either by spring elements, or are formed themselves by leaf springs.

10 Claims, 2 Drawing Sheets

BELT TIGHTENING DEVICE FOR OPEN-END SPINNING MACHINES

FIELD OF THE INVENTION

The invention relates to belt tightening devices for open-end spinning machines with spinning units arranged side-by-side on a machine frame and provided, for example, with spinning rotors driven, via driving pulleys, by means of an endless belt. The belt is tightened by rolls supported in bearing boxes which are attached by means of overhanging swing legs to a holder on the machine, and associated with spring elements.

BACKGROUND OF THE INVENTION

With some devices of prior art, an endless belt such as referred to above will extend so as to contact a plurality of spaced apart driving pulleys with contact being effected by a plurality of tightening rolls which, on the one hand, serve in guiding the belt and which, on the other hand, act to force the belt against the driving pulleys of spinning rotors and/or fiber separating cylinders.

Because of the relatively high rotation rates of modern open-end spinning machines, the tightening rolls and, consequently, the driving belt, are exposed to considerable vibration, in spite of the fact that the rolls are usually spring-loaded. In this regard, the mounting of tightening rolls on swing legs (as provided for, e.g., in Czechoslovak Inventor's Certificate No. 198 068) has proved inadequate or insufficient, because of the effects produced by belt vibration. These effects include wear or fatigue of the swing leg pivots, inaccurate belt guide positioning, fluctuations in the belt thrust power and, consequently, oscillations of the drive as a whole. Negative consequences of these effects include an increased noise level and a shorter lifetime of the mounting.

Attempts have been made to eliminate these drawbacks and to this end the tightening rolls have been mounted on elastic or resilient legs in the form of single leaf spring (British Patent Specification No. 1,349,263 and corresponding West-German Application 2,048,959). Due to the relatively low flexural rigidity of such legs, their torsional rigidity is also low so that the tightening rolls are prone to tilting to the sides. Consequently, the belt can be incorrectly guided, slide off the rolls, come into engagement with the flanged edges of the rolls and become worn by these edges. As a result the lifetime and drive reliability of the belt are markedly reduced, even apart from the above-mentioned rise in noise level produced with such devices.

SUMMARY OF THE INVENTION

It is an object of the present invention to eliminate the disadvantages of prior art as set forth hereinabove and to provide an improved belt tightening device for open-end spinning machines, wherein a better belt thrust onto the driving pulleys is provided, vibration of the belt and other drive elements is eliminated or reduced, and wherein, consequently, the noise level is reduced. The device of the invention is easy to manufacture, does require excessive, expensive maintenance, and uses elements with sufficient torsional rigidity.

To this end, a belt-tightening device is provided, according to the invention, wherein each bearing box of the tightening roll is attached at the end of a pair of flat swing legs extending in spaced apart relationship to each other along the belt, these flat legs being connected with the bearing box by means of spring elements, or being formed themselves as leaf springs. The device according to the invention is advantageous in that each of the tightening rolls is mounted for a swinging movement on at least one pair of the flat legs which, together with the bearing box of the associated tightening roll and the leg-carrying holder, form what is substantially a parallelogram, both other ends of the flat legs being fixedly secured to the holder on the machine frame. However, the invention also includes embodiments wherein the flat legs are non-parallel and can form an angle with each other of up to 30°.

In the device of the invention, the tightening rolls are supported without any side play in the flat legs in that the flat legs provide substantial lateral rigidity while, at the same time, provide substantial flexibility in the direction of thrust. This, of course, positively influences, to a considerable extent, the lifetime of the mounting, and markedly reduces the noise and vibration level of the entire drive system.

From the viewpoint of easy manufacture, the flat legs can be made in the form of leaf springs. To dampen the vibrations and consequently to reduce the noise level of the drive system, it is preferable in this embodiment that at least one of the flat legs is made as a layered leaf spring wherein at least one leaf is prestressed relative to the adjoining leaf and the prestressed leaf is secured at its one end only.

The same effect can be obtained by mounting the flat legs on elastomeric (rubber) bearings, e.g., so-called "silent blocks".

To automatically compensate for the thrust on two adjacent working sites, two tightening rolls are interconnected by means of a pair of flat legs between which the holder is pivotably mounted on the machine frame. This embodiment ensures desirable engagement or contact between the driving belt and the driving pulleys of spinning rotors and/or fiber separating cylinders. To eliminate eventual play in the components as well as vibrations resulting therefrom, the holder is preferably mounted on the frame pivot by means of a shock-absorbing element such as a silent block.

Individual preferred embodiments of the belt tightening device are disclosed below and other features and advantages of the invention will be set forth in, or apparent from, the description of these preferred embodiments which follow.

BRIEF DESCRIPTION OF THE DRAWINGS

Some preferred embodiments of the device according to the invention will hereinafter be described with reference to the accompanying schematic drawings, in which.

DETAILED DESCRIPTION OF PREFERRED EMBODIMENTS

Figure 1:
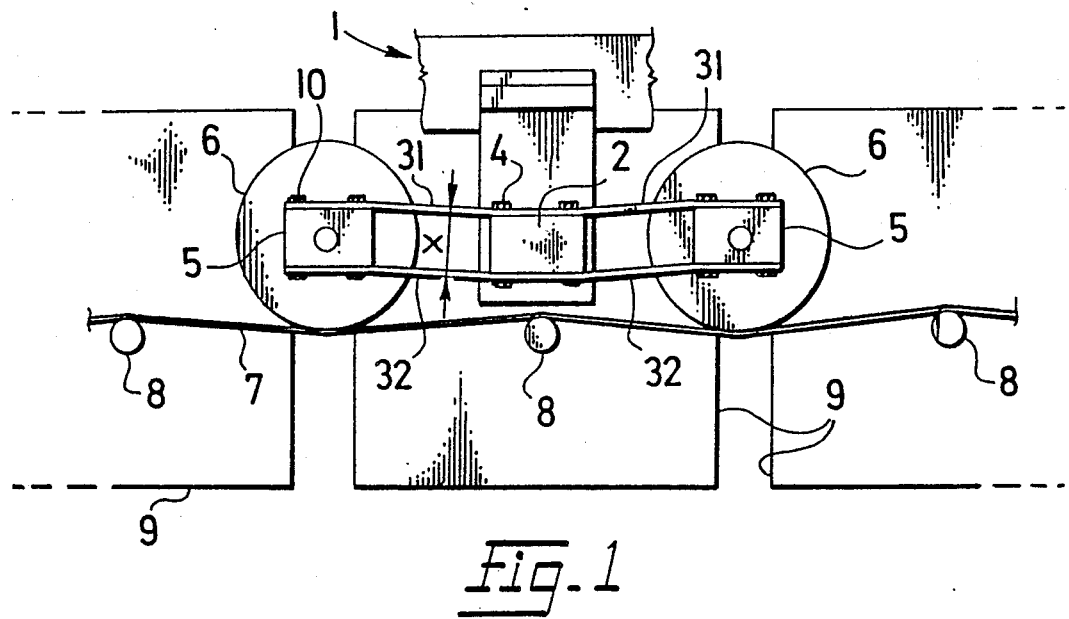
FIG. 1 is a side view of a belt tightening device with a pair of tightening rolls attached to flat legs which at their opposite ends are secured to a holder affixed to the machine frame.
Figure 6:
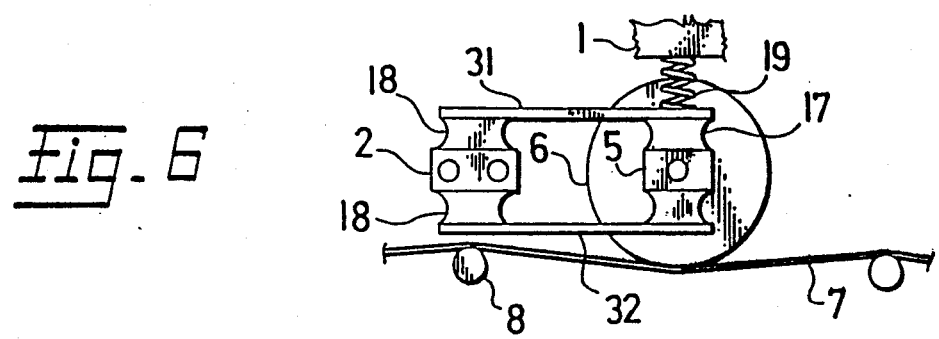
FIG. 6 is a simplified side view of yet another embodiment wherein the flat legs are in the form of elongate flat rigid elements supported on spring elements (silent blocks), and wherein the roll thrust is increased by an auxiliary helical spring.

As can be seen in FIG. 1, belt tightening device of the invention is incorporated in a machine including a machine frame 1 to which a holder 2 is secured. To the upper and the lower side of said holder 2 there are affixed, by suitable connecting means, such as bolts with nuts, indicated at 4, two pairs of flat legs 31, 32, respectively, which carry at their free ends bearing boxes 5 of belt tightening rolls 6. The flat legs 31, 32 of each pair are spaced apart from each other at a distance "x" and extend along an endless belt for driving pulleys 8 of spinning rotors (not shown) of spinning units 9, either from both sides of the holder 2, or from one side only (FIG. 6).

Each bearing box 5 of the tightening roll 6 is secured to the end of the pair of flat legs 31, 32 by suitable connecting means, such as bolts with nuts, indicated at 10. Each pair of flat legs 31, 32 can be secured to the holder 2 wither separately, or the individual members of the pairs, i.e., members 31 and 32, respectively, can be made of a single piece of material as shown in FIG. 1. In this embodiment, the pair of flat legs 31, 32 is made of leaf springs so that two rolls 6 can resiliently swing or pivot and are forced into contact with the driving belt 7 by a force resulting from an appropriate adjustment of the holder 2 relative to the belt 7 such that the flat legs 31, 32, as formed by leaf springs, are suitably prestressed.

Figure 2:
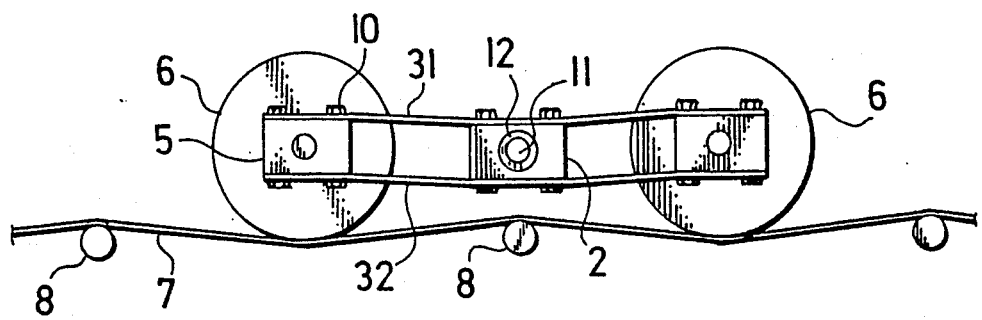
FIG. 2 is a simplified side view of another embodiment wherein the holder is mounted for swinging or pivoting about a pivot provided in the machine frame.

The holder 2 can either be fixedly attached to the machine frame 1, or, preferably, can be mounted for pivoting or swinging about a pivot 11 (see FIG. 2) provided on said frame 1, by means of a shock-absorbing liner 12 such as a "silent block".

Figure 7:
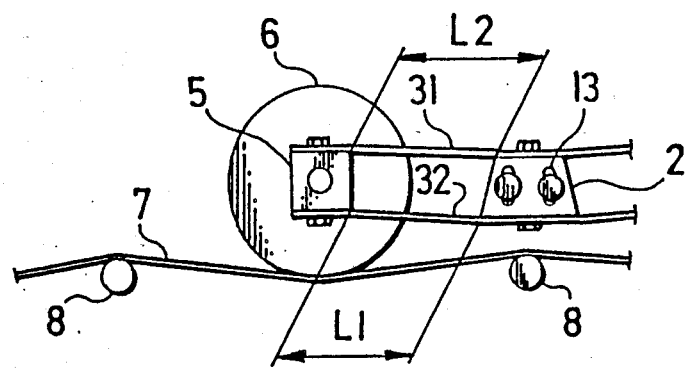
FIG. 7 is a simplified side vie of another embodiment employing flat legs of different lengths.
Figure 8:
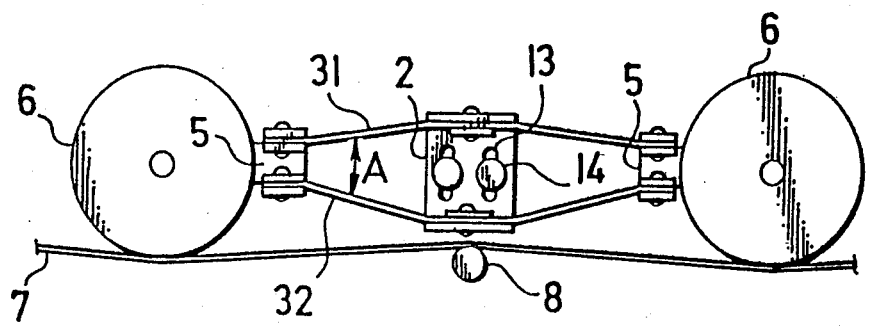
FIG. 8 is a simplified side view of an embodiment including a flat leg holder which is adjustably mounted on the machine frame.

However, the holder 2 can also be preferably arranged on the machine frame 1 so as to be adjustable relative to the driving belt 7. For this purpose holder 2 is provided with one or more longitudinal slots 13 which are perpendicular to the belt 7 and through which set screws 14 extends as shown in FIGS. 7 and 8.

The pair of flat legs 31, 32, as measured beginning from their point of attachment to the holder 2, or from one end up to the bearing box 5, preferably consist of legs of the same length (as shown in FIG. 1 and other figures) whereby the same effects are produced by the two legs 31, 32. In another preferred embodiment, however, the lengths of flat legs 31, 32 of the pair can be different; thus, for instance, as shown in FIG. 7, the lower flat leg 32 is shorter ($L_1$) than the upper leg 31 ($L_2$). In this way there is obtained a differential effect from the leaf springs of which the flat legs 31, 32 are made, as well as a better dampening effect on the vibrations of the belt 7 and the complete drive system.

Apart from this, the flat legs 31, 32 are preferably wider adjacent at their attachment to the holder 2 than at the bearing box 5. According to another embodiment, the flat legs 31, 32 can be thicker adjacent the holder 2 than at the bearing box 5. Different widths and/or thicknesses of flat legs can also positively influence the vibration dampening effect.

Figures 3, 4:
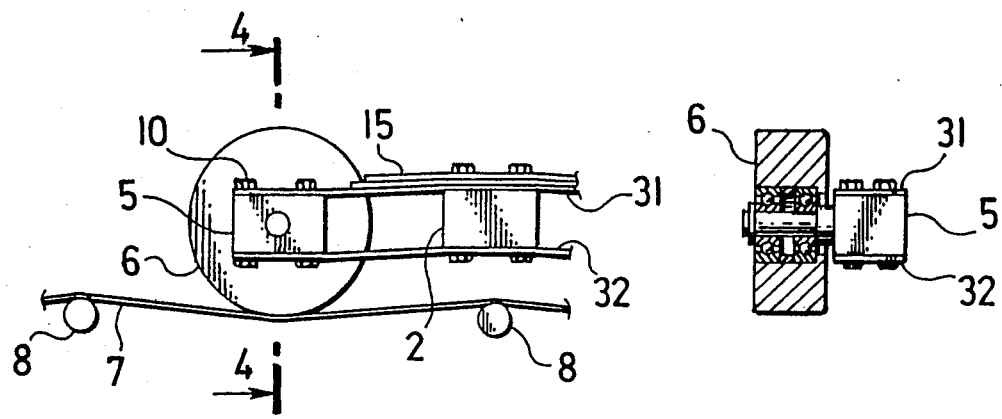
FIG. 3 is a simplified side view of another embodiment wherein a flat leg, in the form of a leaf spring, is reinforced by an additional leaf spring.
FIG. 4 is a section taken along the line IV—IV in FIG. 3.

FIG. 3 shows another preferred embodiment wherein at least one flat leg, e.g. 32, is made of a leaf spring and is reinforced by an additional spring 15. The spring 15 can be fixed, together with the flat leg 31, by fastening means, denoted 4, to the holder 2 while its other end does preferably not extend up to the bearing box 5 of the belt tightening roll 6, as illustrated. However, in accordance with a further non-illustrated embodiment, this other end of the additional spring 15 can extend up to the bearing box 5 and, optionally, be attached thereto.

The flat legs 31, 32 extend along the belt 7 in parallel to each other at a distance "x" (FIG. 1) corresponding, for example, to the width of the bearing box 5 to which they are both laterally attached. In this case the pair of flat legs 31, 21 together with the holder 2 and the bearing box 5, form a parallelogram. It, however, is possible and also advantageous if the flat legs 31, 32 slightly converge from the holder 2 toward the bearing box 5 of the belt tightening roll 6 as shown in FIG. 8. The angle A, illustrated in FIG. 8, included between the converging flat legs 31, 21 should be smaller than 30°.

Figure 5:
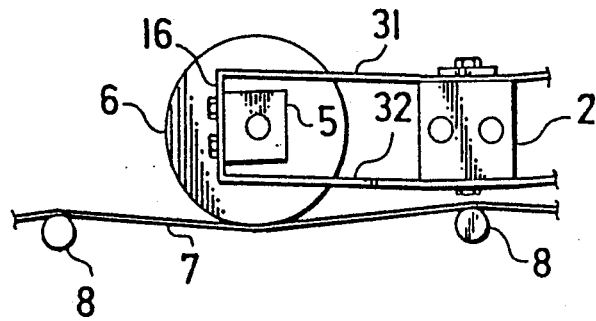
FIG. 5 is a simplified side view of an alternative embodiment wherein the bearing box of the belt tightening roll is secured to a cross plate connecting the ends of flat legs with each other.

As shown in FIG. 5, the bearing box 5 can be secured to the pair of flat legs 31, 32 by means of a cross plate 16 which connects their free ends with each other. Alternatively, the cross plate can be omitted and the bearing box 5 can be affixed directly to the flat legs 31, 32 made of a single piece of material suitably looped in the form of a hairpin.

Another embodiment is shown in FIG. 6 in which each of the pair of flat legs 31, 32 is made of a rigid flat element, a spring element 17 being provided at least between the ends of flat legs 31, 32 and the bearing box 5. This spring element 17 is made of an elastic material such as a silent block of rubber or the like. Preferably, another spring element 18 is provided between the holder 2 and the ends of flat legs 31, 32. To enhance the thrust efficiency, an auxiliary spring 19 can be provided between the machine frame 1 and the bearing box 5. These two embodiments, i.e., mounting of bearing box 5 on the flat legs 31, 32 made of leaf springs, and mounting by means of spring elements 17, can also be combined with each other.

The device of the invention is simple but very reliable in operation. The driving belt 7 is resiliently forced by the flat legs 31, 32 together with the rolls 6 into engagement with the driving pulleys 8 whereby the necessary torque transmission is ensured. Due to the relatively high torsional rigidity of the flat legs 3!, 32, the belt tightening rolls 6 are guided very accurately and without any play, i.e., in parallel to the edges of rolls 6. Any vibrations which arise are absorbed by the spring elements 17, 18, or suppressed by the resiliency of the two flat legs 31, 32 made of leaf springs, due to different lengths and/or thicknesses thereof, or absorbed by the additional leaf springs 15. In this way the main object of the invention is economically achieved, since the embodiments thereof as hereinabove described are easy to manufacture and do not require excessive maintenance.

Although the present invention has been described relative to exemplary embodiments thereof, it will be understood by those skilled in the art that variations and modifications can be effected in these exemplary embodiments without departing from the scope and spirit of the invention.

We claim:

1. A belt tightening device for open-end spinning machines with spinning units arranged side-by-side on a machine frame and provided with spinning rotors driven, through driving pulleys, by means of an endless belt which is tightened by tightening rolls supported in bearing boxes attached to a holder on the machine frame, wherein the improvement comprises a pair of flat swing legs for supporting the bearing box of the belt tightening roll, said pair of flat legs extending along the endless driving belt in spaced relationship to each other, and being formed by leaf springs.

2. A device according to claim 1 wherein at least one flat leg in the form of a leaf spring is reinforced by an additional leaf spring attached, together with said at least one flat leg, by fastening means to the holder.

3. A device according to claim 2 wherein the holder is pivotably mounted on a pivot shaft of the machine frame by means of an elastic shock-absorbing liner member.

4. A device according to claim 2 wherein the holder includes a longitudinal slot which is perpendicular to the belt and which receives a set screw used in connecting the holder to the machine frame.

5. A device according to claim 1, wherein two bearing boxes together with the belt tightening rolls are connected with each other by the pair of flat legs and the holder is supported on the machine frame between said bearing boxes.

6. A device according to claim 1 wherein the lengths of the flat legs, as measured from their point of attachment to the holder up to their point of attachment to the bearing box, are different.

7. A device according to claim 1 wherein the bearing box of the belt tightening roll is attached to a cross plate which connects the ends of flat legs together.

8. A device according to claim 1 wherein the flat legs converge from the holder toward the bearing box.

9. A device according to claim 8 wherein the flat legs define an angle therebetween of up to 30°.

10. A device according to claim 1 wherein the spring means comprises at least one elastic shock-absorbing member which is disposed between the bearing box of the bolt tightening roll and the ends of the flat legs.

* * * * *